United States Patent [19]

Hisazumi et al.

[11] Patent Number: 4,851,245

[45] Date of Patent: Jul. 25, 1989

[54] SMOKABLE SYNTHETIC FOOD-PACKAGING FILM

[75] Inventors: Nobuyuki Hisazumi, Tsuchiura; Shinichiro Funabashi, Iwaki; Yoshihiko Tomioka, Tokyo, all of Japan

[73] Assignee: Kureha Kagaku Kogyo Kabushiki Kaisha, Tokyo, Japan

[21] Appl. No.: 151,538

[22] Filed: Feb. 3, 1988

Related U.S. Application Data

[63] Continuation-in-part of Ser. No. 892,917, Aug. 4, 1986, abandoned.

[30] Foreign Application Priority Data

Aug. 6, 1985 [JP] Japan .................. 60-172643

[51] Int. Cl.$^4$ .................. A22C 13/00; B65D 81/34
[52] U.S. Cl. .................. 426/105; 426/127; 426/129; 426/314; 426/315; 426/316; 426/415; 428/34.8; 428/216; 428/475.5; 428/476.1; 428/479.3; 428/475.2; 428/507; 428/520; 428/522; 528/58; 138/118.1
[58] Field of Search .............. 528/58; 428/216, 474.7, 428/474.9, 475.5, 475.8, 476.1, 476.3, 476.4, 479.3, 475.2, 520, 522, 507, 516, 517, 518, 34.8; 426/127, 129, 314, 315, 316, 415; 138/118.1

[56] References Cited

U.S. PATENT DOCUMENTS

| | | | |
|---|---|---|---|
| 4,287,217 | 10/1986 | Hammer et al. | 138/118.1 |
| 4,303,711 | 3/1979 | Erk et al. | 138/118.1 |
| 4,347,332 | 4/1983 | Odorzynski et al. | 525/58 |
| 4,427,825 | 4/1982 | Degrassi et al. | 525/58 |
| 4,468,427 | 5/1981 | Degrassi et al. | 428/475.8 |
| 4,500,677 | 6/1985 | Maruhashi et al. | 525/57 |
| 4,601,929 | 8/1985 | Erk et al. | 138/118.1 |
| 4,615,922 | 10/1986 | Newsome | 428/475.8 |
| 4,659,599 | 7/1985 | Strutzel | 138/118.1 |
| 4,734,327 | 6/1984 | Vicik | 428/332 |
| 4,758,463 | 3/1983 | Vicik | 428/216 |

FOREIGN PATENT DOCUMENTS

| | | |
|---|---|---|
| 555779 | 1/1983 | Australia . |
| 572944 | 4/1985 | Australia . |
| 0277839 | 5/1988 | European Pat. Off. . |

*Primary Examiner*—Ellis P. Robinson
*Assistant Examiner*—James J. Seidleck
*Attorney, Agent, or Firm*—Oblon, Spivak, McClelland, Maier & Neustadt

[57] ABSTRACT

Disclosed herein is a smokable food-packaging film comprising:

at least one layer of a mixture of 50 to 80 wt % polyamide having a melting point of 120° to 210° C. and a recrystallization temperature of not lower than 50° C. and 20 to 50 wt % α-olefin - vinyl alcohol copolymer, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of said film being 20 to 60 μm.

10 Claims, No Drawings

SMOKABLE SYNTHETIC FOOD-PACKAGING FILM

CROSS-REFERENCE TO RELATED APPLICATION

This application is a continuation-in-part of application Ser. No. 892,917, filed on Aug. 4, 1986, now abandoned.

BACKGROUND OF THE INVENTION

The present invention relates to a smokable synthetic food-packaging film which shows a smoke permeability and an oxygen-barrier property, and which also has excellent smokability and preserving effect without secondary-packaging in plastic bags, and more particularly, to a smokable food-packaging film comprising: at least one layer of a mixture of 50 to 80 wt% polyamide having a melting point of 120° to 210° C. and a recrystallization temperature of not lower than 50° C. and 20 to 50 wt% α-olefin-vinyl alcohol copolymer, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of said film being 20 to 60 μm.

Hitherto, the packages for foodstuffs such as prepared meat which is to be smoked is mainly conducted by primary packaging and secondary packaging. For primary packaging, a packaging material is selected so that it is suitable for forming and maintaining the shape of foodstuffs which are packed directly into the packaging material, and for rapidly permeating smoke components during the smoking process. As examples of packaging materials used for primary packaging, casings made from animal intestines such as those of cows, pigs, or sheep, and cellulose casings made of viscose film may be mentioned. These smokable primary packaging materials, however, lack gas-barrier properties and are unsuitable as packaging materials for ordinary food-storage. Therefore, it is necessary to package the foodstuffs again in a film which has a gas-barrier property (secondary packaging).

Other known smokable primary packaging materials are films of natural polymer such as collagens, chitins and polysaccharides, or paper which is impregnated with a polyvinyl alcohol resin [Japanese Patent Publication No. 47-43198 (1972)], paper impregnated with an ethylene-vinyl alcohol copolymer containing a plasticizer [Japanese patent application Laid-Open (KOKAI) No. 52-57347 (1977)], and polyester copolymer films containing polyalkylene oxide [Japanese Patent Publication No. 59-117530 (1984)]. These smokable primary packaging materials also have insufficient gas-barrier property, and thus necessitate a secondary packaging for the preservation of the food. Although films which are mechanically perforated or porous films have been proposed in order to improve the smoking properties (British Pat. No. 1,397,472), these packaging materials also necessitate secondary packaging. Thus, conventional smokable packaging materials required a secondary packaging process, and as a result there are defects of the increases of the number of manufacturing steps, packaging materials, and packaging machines, and thus increase the manufacturing cost.

As known films having both smoke-permeability and oxygen gas-barrier property, there are films of polyamides such as polycaprolactam and of polymer blends of polyamide and at least one of ionomer resin, modified ethylene-vinyl acetate copolymer and modified polyolefin (European patent application No. 0,139,888A1).

European patent application No. 0,139,888A1 suggests that films consisting of polyamides which can absorb at least 3 wt% of their own weight of water up to saturation point, such as, for example, polycaprolactam, polyaminooenanthic acid amide, polyhexamethylene adipamide and polyhexamethylene sebacamide, and films consisting of polymer blends of polyamides such as those described above, and at least one of ionomer resin, modified ethylene-vinyl acetate copolymer and modified polyolefin, are useful as smokable thermoplastic synthetic casings. However, the only films that are concretely disclosed therein are transparent, colorless shrinkable casings formed of polycaprolactam or polyhexamethylene adipamide. The casings of polycaprolactam and polyhexamethylene adipamide show an insufficient oxygen gas-barrier property, and the casings thereof are therefore inadequate for the prolonged storage periods of foods, in particular, for foodstuffs which are susceptible to oxygen.

Further, a food-packaging film comprising polyamide and ethylene-vinyl alcohol copolymer is disclosed in the following U.S. Patents and German patent application.

U.S. Pat. No. 4,347,332 discloses a method for the production of a film having relatively high levels of strength and toughness and good oxygen barrier properties, comprising:

a. forming a blend of about 90 to 20 weight percent of a film-forming polyamide resin having a molecular weight of about 20,000 to 30,000 and a melting point temperature of about 415 degrees to 440 degrees Fahrenheit, conversely about 10 to 80 weight percent of an ethylene vinyl alcohol copolymer having a molecular weight of about 15,000 to 30,000 and a melting point temperature of about 325 degrees to 375 degrees Fahrenheit, and about 2 to 25 percent, based upon the weight of said polyamide resin, of a plasticizer therefor, said plasticizer being effective to lower the processing temperature of said polyamide resin to a value approximately that of said copolymer and below the temperature at which any substantial amount of degradation would occur therein under appropriate conditions for extrusion;

b. heating said blend to said processing temperature;

c. forcing said blend through an extrusion die to produce a film of said blend; and d. cooling said film to obtain a product having such desirable levels of toughness and oxygen barrier capability.

U.S. Pat. No. 4,427,825 discloses a heterogeneous melt blended composition consisting essentially of: a polyamide, and from 1 to 65% by weight of an ethylene vinyl alcohol copolymer having 15 to 65 mol percent ethylene, in the absence of plasticizer, wherein there are regions of ethylene vinyl alcohol copolymer having an average diameter of less than 500 angstroms in the polyamide, said composition having been processed at a temperature of from about 225° C. to 252° C. and being substantially free from crosslinking.

U.S. Pat. No. 4,468,427 discloses a composition of matter comprising a polyamide and from one to 65 percent by weight of an ethylene vinyl alcohol copolymer. A preferred composition comprises polyepsiloncaprolactam and from 5 percent to 30 percent by weight of ethylene vinyl alcohol copolymer containing 15 to 65 mol percent ethylene.

German patent application No. 3229158 discloses a process for producing a film from a composition of a copolymer of ethylene and vinyl acetate and Nylon, which process comprises the steps of (a) preparing a composition comprising about 90 to about 10% by weight of a Nylon resin, about 10 to about 90% by weight of a copolymer of ethylene and vinyl alcohol of a molecular weight of about 15,000 to about 30,000 and a melting point of about 325° to 375° F., and a plasticizer of upto 25% by weight based on the weight of the Nylon resin, the processing temperature of the composition being close to the processing temperature of the copolymer and being lower than the limiting vlaue at which the deterioration of the substantial amount occurs to the copolymer under the appropriate extruding conditions, (b) heating the thus obtained composition to the processing temperature, (c) extruding the composition through an extruding die to produce a film, (d) adjusting the temperature of the thus extruded film in order to obtain an effective orientation of the film, (e) stretching the thus adjusted film at a temperature at which at least a monoaxial orientation is obtained, and (f) cooling the thus stretched film, thereby obtaining the relatively thin (in thickness) film which has the strength of a desirable level, the toughness and the oxygen gas-barrier property.

As a result of various studies into how to achieve this aim, it has been found by the present inventors that the smoke-permeability of a food-packaging film during a smoking process has a close relationship with its transmission to methanol in the smoke components, and that, in the case of a foodstuff which is susceptible to oxygen is packaged with a smokable food-packaging film of a thermoplastic resin which has oxygen gas-barrier property sufficient for practical use and also a predetermined transmission to methanol, on the assumption that its smoke-permeability is the same as transmission to methanol, a food package which has good smokability and which can store for long time is obtained without secondary packaging in plastic bags. The present invention has been attained on the basis of this findings.

Accordingly, it is an object of the present invention to provide a food-packaging film of a thermoplastic resin which has good smokability and excellent oxygen gas-barrier property.

Namely, it is an object of the present invention to provide a smokable food-packaging film which shows such good smoking effect and oxygen gas-barrier property, and can be used to preserve foodstuffs which are susceptible to oxygen for long periods.

SUMMARY OF THE INVENTION

In a first aspect of the present invention, there is provided a smokable food-packaging film comprising:
at least one layer of a mixture of 50 to 80 wt% polyamide having a melting point of 120° to 210° C. and a recrystallization temperature of not lower than 50° C. and 20 to 50 wt% $\alpha$-olefin-vinyl alcohol copolymer, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of said film being 20 to 60 μm.

In a second aspect of the present invention, there is provided a smokable food-packaging film comprising;
a layer of a mixture of 50 to 80 wt% polyamide having a crystal melting point of 120° to 210° C. and a recrystallized temperature of not lower than 50° C. and 20 to 50 wt% of an $\alpha$-olefin-vinyl alcohol copolymer; and
at least one layer of a material selected from the group consisting of (a) an $\alpha$-olefin copolymer of polyethylene, polypropylene or polybutene-1, (b) a copolymer of ethylene, propylene or butene-1 and vinyl acetate or methacrylic ester, (c) a copolymer of ethylene, propylene or butene-1 and methacrylic acid, or a metal salt thereof, (d) an elastomer of a plasticized polyvinyl chloride, polyester or a styrene rubber, (e) a cellulose and (f) a polyamide, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of the layer of said mixture being 20 to 60 μm and the thickness of the layer of said thermoplastic material being 10 to 50 μm.

DETAILED DESCRIPTION OF THE INVENTION

A smokable food-packaging film according to the present invention is characterized by at least one layer of a mixture of 50 to 80 wt% polyamide having a crystal melting point of 120° to 210° C. and a recrystallization temperature of not lower than 50° C. and 20 to 50 wt% $\alpha$-olefin-vinyl alcohol copolymer, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of said film being 20 to 60 μm.

"The concentration of methanol" in the present invention is the relative concentration when the concentration under the saturated vapor pressure of methanol at the temperature is set as 100%.

The methanol-transmission of a film of a thermoplastic resin layer according to the present invention may be used as a standard for smoking property. The smoke components generated during the heating of a material in a smoking process usually permeate through the food-packaging film and are transferred to the food, thereby producing the characteristic fragrance and taste of smoking. As a result of measuring the permeability to the smoke components of various packaging films, it has been found that the methanol-transmission is suitable as a parameter of smoking property.

Namely, pork sausage meat was packed into tubular casing (thickness: 40 μm) of the materials shown in Table 1, and both ends of each casing were sealed. These sausages were smoked at 60° C. for 75 minutes, and then were subjected to sensory examination with respect to the taste and fragrance of their contents, and their permeabilities to smoke components (model substances) were measured. The results are shown in Table 1.

The evaluations of the sensory examination (panel tests performed by 10 panelists) are as follows.
0: No smokability (smoking has no effect)
1: Slightly recognizable smoked flavor
2: Clearly recognizable smoked flavor
3: Strongly recognizable smoked flavor
4: Extremely strong smoked flavor The permeabilities to smoke components are shown in Table 1 as relative values, based on the assumption that the permeability of nylon 6 to all the smoke components is 1. From these results it can be seen that methanol-transmission is correlated with the evaluation of the sensory examination of smokability.

Since components other than methanol are not related to the evaluations of the sensory examination of smokability, they are not suitable as parameters of the evaluation of smokability.

gas-transmission of a film according to the present invention is not more than 50 cc/$m^2$.day.atm at a temperature of 30° C. and a relative humidity of 60%. Although ordinary food does not need secondary packaging if it is packaged with a film having an oxygen gas-transmission of not more than 200 cc/$m^2$.day.atm, food which is particularly susceptible to oxygen cannot be preserved for long time in such a film, so that secondary packaging is necessary. In particulrar, if food such as meat paste, which is so susceptible to oxygen that the myoglobin etc., therein is apt to lose its color owing to oxygen, is packaged with a film having an oxygen gas-transmission of more than 50 cc/$m^2$.day.atm, it cannot be stored for long periods and the myoglobin or the like therein may lose its color.

In a smokable food-packaging film according to the present invention, the polyamide which constructs a film having the properties of a transmission to 50% methanol of not less than 200 g/$m^2$.day.atm at a temperature of 60° C. and a relative humidity of 0%, and an oxygen gas-transmission of not more than 50

TABLE 1

| Test Items | Material of Film | | | | | |
|---|---|---|---|---|---|---|
| | Cellulose | Nylon 6 | Nylon 6-66 | Low-density Polyethylene | Plasticized Vinyldene Chloride Copolymer | Polyethylene Terephthalate |
| Sensory Test for Smokability | 4 | 3.1 | 3.5 | 2.6 | 1.9 | 0.3 |
| Permeability (Relative value) | | | | | | |
| Water Vapor | 10 | 1 | 1.2 | 0.1 | 0.04 | 0.3 |
| Methanol | 1.7 | 1 | 1.5 | 0.2 | 0.1 | 0.01 |
| Acetone | 2 | 1 | 1 | 100 | 200 | 1 |
| Ethyl Acetate | 1 | 1 | 1 | 17 | 17 | 0.8 |
| Cresol | — | 1 | 1 | 250 | 13 | — |
| Oxygen | 100 | 1 | 1.5 | 49 | 0.6 | 0.9 |

[Notes]
(1) Water vapor-transmission was measured by the method of JIS Z-0208 under the condition of a temperature of 40° C. and a relative humidity of 90%.
(2) To measure the methanol-transmission, a piece of film was inserted into a gas-transmission measuring cell of a YANAKO GTR10XL (tradename, manufactured by Yanagimoto Seisakusho Co., Ltd.), methanol vapor diluted to a concentration of 50% by nitrogen at 60° C. and 0% RH was brought into contact with one side of the film, while nitrogen gas at 60° C. and 0% RH was brought into contact with the other side of the film, and the quantity of methanol which permeated the film was determined by gas chromatography. The permeabilities to other smoke components (model substances) were also measured by the same method mentioned above.
(3) Oxygen gas-transmission was measured at a temperature of 30° C. and a relative humidity of 60% using a piece of film and OXTRAN-100 (tradename, manufactured by Modern Control Co.).

The transmission to 50% concentration of methanol of a film according to the present invention is not less than 200 g/$m^2$.day.atm, preferably, not less than 300 g/$m^2$.day.atm and, more preferably, not less than 1,000 g/$m^2$.day.atm at a temperature of 60° C. and a relative humidity of 0%.

A film having a methanol-transmission of less than 200 g/$m^2$.day.atm cannot exhibit any smoking effect, even with food which needs only a slight taste and fragrance of smoking. Therefore, a film according to the present invention must have a methanol-transmission of not less than 200 g/$m^2$.day.atm and, more preferably, not less than 300 g/$m^2$.day.atm in order to provide an ordinary smoked flavor. In order to provide an even clearly smoked flavor, the film should have a methanol-transmission of not less than 1,000 g/$m^2$.day.atm and, in order to provide a strongly smoked flavor, which is called heavy smoking, a film having a methanol-transmission of not less than 2,000 g/$m^2$.day.atm is used.

It is necessary that the film has oxygen gas-barrier property which is exhibited by an oxygen gas-transmission of less than a predetermined value, in order to preserve the smoked food for long time. The oxygen cc/$m^2$.day.atm at a temperature of 30° C. and a relative humidity of 60%, is 50 to 80 wt%, preferably 65 to 75 wt%, and the copolymer of α-olefin and vinyl alcohol is 50 to 20 wt%, preferably 35 to 25 wt%.

If the polyamide is less than 50 wt%, the mechanical strength, creep resistance, dimensional stability of the packaging film, its property for clinging to an article in conformity therewith and its smokability are inferior, so that it is difficult to obtain the desired smokable food-packaging film therefrom. On the other hand, if the polyamide exceeds 90 wt% it is difficult to obtain the desired oxygen gas-barrier property.

The polyamide according to the present invention shows a crystal melting point of 120° to 210° C., preferably 130° to 205° C. and a recrystallization temperature of not lower than 50° C., preferably not lower than 70° C.

The melting point is a temperature which shows the maximum value of the melting point curve obtained by measuring with a temperature when elevating 8 to 10 mg of a sample at a rate of 20° C./min by using a differential scanning calorimeter (Mettler Co., Ltd., TA-3000).

The recrystallization temperature of polyamide resin is measured by the following method while using a differential scanning calorimeter (Mettler Co., Ltd., TA-3000).

8 to 10 mg of a specimen of PA resin are heated from 30° C. to 230° C. in the heating rate of 50° C./min, and the specimen is completely molten by keeping the specimen for 5 min at 230° C. Then the molten specimen is cooled to −50° C. in the cooling rate of 50° C./min, and the specimen is completely frozen by keeping the specimen for 5 min at −50° C. The frozen specimen is reheated to 230° C. in the heating rate of 20° C./min. The recrystallization temperature of PA resin is obtained from the differential scanning calorimeter (DSC) curve.

As a polyamide according to the present invention, nylon 6-66, nylon 6-12 and a mixture thereof may be exemplified.

Nylon 6-66 of a copolymerization of Nylon 6 to Nylon 66 of 90/10 to 40/60, is preferable and Nylon 6-12 of a copolymerization of Nylon 6 to Nylon 12 of 90/10 to 40/60 is preferable.

As a copolymer of α-olefin and vinyl alcohol according to the present invention a copolymer showing melting point of 120° to 200° C., more preferably 130° to 190° C. is preferable and ethylene-vinyl alcohol copolymers, propylene-vinyl alcohol copolymers, and butene-1-vinyl alcohol copolymers may be exemplified.

The vinyl alcohol units in a copolymer of α-olefin and vinyl alcohol are 40 to 80 mol%, preferably 50 to 70 mol%. If the vinyl alcohol units is less than 40 mol%, it is difficult to obtain the desired oxygen gas-barrier property, while if the vinyl alcohol units is more than 80 mol%, the thermal stability of the film is so reduced that it is difficult to stably manufacture a smokable food-packaging film.

In another embodiment of the present invention, a good-packaging film is composed of a laminate of a thermoplastic resin layer of a mixture of 50 to 80 wt% polyamide and 20 to 50 wt% copolymer of α-olefin and vinyl alcohol, the layer having satisfactory smoking properties and oxygen gas-barrier property, and at least one layer selected from the group consisting of (a) an α-olefin polymer such as polyethylene, polypropylene polybutene-1, (b) a copolymer of ethylene, propylene or butylene-1 and vinyl acetate or methacrylic ester, (c) a copolymer of ethylene, propylene or butene-1 and methacrylic acid, or a metal salt thereof, (d) an elastomer such as plasticized polyvinyl chloride, polyester and a styrene rubber, (e) a cellulose, and (f) a polyamide having an oxygen gas transmission exceeding the value in accordance with the present invention (50 cc/m$^2$.day.atm).

When laminating the thermoplastic resin layer to the other layer, it is preferable from the viewpoint of the improvement of the adherence to dispose an adhesive layer between the thermoplastic resin layer and the other layer to be laminated.

As the adhesive agent, modified polyolefin or copolymerized polyolefin by a carboxylic acid such as fumaric acid, maleic acid, etc. is preferable. As polyolefin homopolymer of olefin such as ethylene, propylene, etc., copolymer such as copolymer of ethylene and vinyl acetate, copolymer of ethylene and acrylic acid, copolymer of ethylene and ester of methacrylic acid, etc., terpolymer and mixtures thereof may be exemplified.

The thickness of the smokable food-packaging film according to the present invention is 20 to 60 μm. In a laminate film, the thickness of the thermoplastic resin film having smokability and oxygen gas-barrier property is 20 to 60 μm, and the thickness of the other layer(s) is preferably 10 to 50 μm.

As the smokable food-packaging according to the present invention, a film showing the initial stress of not higher than 0.6 Kg/mm$^2$ at the 25% elongation is favorable.

In the case of the initial stress of over 0.6 Kg/mm$^2$ at 25% elongation, the film-forming property of such a film is apt to be poor.

The initial stress of the film is measured by the following method while using a tensile tester (Orientec Co., Ltd., RTM-100).

The pelletized specimen produced by melt-extruding the mixed resin composition is molded under the conditions of preheating for 2 min and pressurizing (100 kg/cm$^2$) for one minute while using a hot-press molding machine at 210° to 240° C., and then the thus molded material is rapidly cooled in a cold water of 5° C. to obtain an amorphous sheet of a thickness of 0.3 mm. The thus obtained amorphous sheet is cut into long strips of 10 mm in width and about 100 mm length to obtain test pieces. The thus obtained test piece is set on the tensile tester (the distance between the fastners being 52 mm), and the test piece is heated by contacting a metal block heated to 70° C. thereto for 5 sec. The thus heated test piece is pulled at a pulling rate of 500 mm/min, thereby obtaining the strain-stress curve. From the thus obtained strain-stress curve, the initial stress at the 25% elongation is obtained.

In the case of a laminate sheet, although the test piece can be formed by the above-mentioned hot-press molding method, the test piece is formed by the following method. Each of resins are melt-extruded from a plurality of extruders, and the thus extruded molten resins are supplied to the T-die, thereby extruding the thus supplied molten resins as a laminate material then the thus obtained laminate material is rapidly cooled in cold water of 5° C. to obtain an amorphous laminate sheet of a thickness of 0.3 mm. The thus obtained amorphous laminate sheet is cut into long strips of 10 mm in width and about 100 mm in length to obtain test pieces.

Foodstuffs which are to be packaged with the food-packaging film according to the present invention have need of a smoking process and a good preservability during prolonged storage periods. Animal products such as ham, sausages, bacon and meat, dairy products such as cheese, processed marine products such as fish and shellfish, and processed eggs may be exemplified.

The food-packaging film of a thermoplastic resin according to the present ivnention is a manufactured by an ordinary bubble process and either an unstretched or a stretched film (non-shrinkable or shrinkable film) is used depending on purpose. A stretched (shrinkable) film is obtained by stretching according to an ordinary method.

For example, the shrinkable film is produced by the following process.

A mixture of 50 to 80% by weight of polyamide and 20 to 50% by weight of α-olefin-vinyl alcohol copolymer is melt-mixed and extruded in a tubular form while using a circular die provided with an extruder. The thus extruded tubular film is (1) immediately chilled by cold water, etc., (2) immediately chilled by a cooling roll, or (3) immediately chilled by a cooling medium other than water thereby forming a tubular film.

The temperature of the cold water, the cooling roll and the cooling medium is 0° to 40° C., preferably 0° to 20° C.

Then, the thus obtained tubular film is heated to 30° to 100° C., preferably 50° to 90° C., and immediately stretched biaxially in 2 to 5 times, preferably 3.0 to 4.5 times both machine and transverse directions by the inflation method, thereby forming the shrinkable film.

In the smoking process in the present invention, a package which is formed in an ordinary packaging process and optionally is dried, is placed in smoke chamber for a predetermined period (the period depends upon the food being smoked and is from several minutes to several hours), at a temperature of 15° to 80° C. The smoking temperature can be selected to be 15° to 30° (cold-smoking method), 30° to 50° C. (warm-smoking method), or 50° to 80° C. (hot-smoking method), but warm smoking and hot smoking methods which are capable of mass-production at a high temperature in a short period of time are preferable. The smoking may be conducted by an electrical smoking method in which an electric field is applied to an atmosphere of smoke of a hard wood such as oak and cherry wood, in an ordinary way.

A smokable food-packaging film according to the present invention has a good transmission to 50% concentration of methanol of not less than 200 g/m².day.atm, preferable not less than 300 g/m².day.atm and, more preferably, not less than 1,000 g/m².day.atm at a temperature of 60° C. and a relative humidity of 0%, and high oxygen gas-barrier property having an oxygen gas-transmission of not more than 50 cc/m².day.atm at a temperatur of 30° C. and a relative humidity of 60%. In addition, the film is efficient in mechanical strength, the creep resistance, the dimensional stability, the property of clinging to an article in conformity therewith, and it is also efficient in smokability. Accordingly, the film is useful for the prolonged storage periods of smoked food-packages. In particular, it exhibits excellent smokability and oxygen gas-barrier property with respect to packages of foodstuffs which are susceptible to oxygen such as, for example, ham, sausages, meats and cheese, and is capable of storing them for long time without secondary packaging.

The present invention will be explained hereinunder with reference to embodiments thereof.

EXAMPLES 1 TO 3, COMPARATIVE EXAMPLE 1

A nylon 6-66 [a polyamide of a copolymer of monomer of nylon 6 and monomer of nylon 6-66 (nylon 6 content of 85 wt%, melting point of 200° C. and recrystallization temperature of 77.1° C.)], and a copolymer of ethylene and vinyl alcohol (molar ratio of 43 to 57 and melting point of 164° C.) were prepared respectively. The polyamide and the ethylene-vinyl alcohol copolymer were mixed in weight ratios of 75 to 25 (Example 1), 70 to 30 (Example 2) and 65 to 35 (Example 3). Each of the mixtures was extruded into a tubular form at a temperature of 230° C. using an extruder provided with a circular die. The extruded tubular film is immediately cooled by cold water (10° C.) and then stretched at 60° C. by an ordinary inflation method (MD/TD stretching ratio=2.5/4,0, so that stretched tubular films of 40 μm in thickness and 70 mm in folded width were obtained as Examples 1, 2 and 3, respectively.

The transmission to 50% concentration of methanol at a temperature of 60° C. and a relative humidity of 0% and the oxygen gas-transmission at a temperature of 30° C. and a relative humidity of 60% of the films in Examples 1, 2 and 3 were measured by the above-described measuring method. The results are shown in Table 2. The tubular films of Examples 1, 2 and 3 were filled with about 200 g of pork sausage meat of 50 wt% pork, 20 wt% fat, 6 wt% starch, 2 wt% salt and 22 wt% water, and both ends of each sausage were clipped, thereby obtaining sausages of Examples 1, 2 and 3. Each sausage was dried in a smoke chamber for 15 minutes at a temperature of 60° C. and a relative humidity of 10 to 30%, and was thereafter smoked for 90 minutes at a temperature of 60° C. and a relative humidity of 40 to 60%. The smokability of the films of Examples 1, 2 and 3 were examined by the above-described sensory examination (panel tests), the results being shown in Table 2.

For Comparative Example 1, the methanol-transmission, oxygen gas-transmission and smokability of the package of a cellulose casing on the market, which is 30 μm in thickness and 50 mm in folded width, were measured. The results are shown in Table 2.

TABLE 2

| | Example 1 | Example 2 | Example 3 | Comparative Example 1 |
|---|---|---|---|---|
| Initial Stress at 25% elongation (Kg/mm²) | 0.26 | 0.25 | 0.24 | — |
| Smokability | | | | |
| Taste | 2.4 | 2.2 | 2.3 | 3.0 |
| Fragrance | 2.7 | 2.8 | 2.9 | 3.5 |
| Methanol-transmission (g/m² · day · atm) | 5.600 | 4,700 | 4,200 | 2,600 |
| Oxygen-transmission cc/m² · day · atm | 39 | 36 | 31 | 1,000 |
| Evaluation | | | | |
| Smokability | A | A | A | A |
| Preservability | A | A | A | D |

[Notes]
(I) Criteria for Evaluation
  (i) Smokability (panel tests performed by 10 panelists)
  A: Strongly recognizable smoked flavor ⎫
  B: Considerably strongly recognizable smoked flavor ⎬ (Utilizable)
  C: Recognizable smoked flavor ⎭
  D: Slightly recognizable smoked flavor ⎫ (Not
  E: No smokability (smoking has no effect) ⎭ utilizable)
  (ii) Long-period preservability
  A: Excellent (more than 60 days) ⎫ (Utilizable)
  B: Good (more than 30 days) ⎭
  C: Fair (not utilizable)
  D: Bad (not utilizable)
(II) Criteria for Smokability-(Sensory Test): (panel tests performed by 10 panelists)
  0: No smokability (smoking has no effect)
  1: Recognizable smoked flavor
  2: Clearly recognizable smoked flavor
  3: Strongly recognizable smoked flavor
  4: Remarkable smoked flavor As is clearly seen from Table 2, the smokable food-packaging film in accordance with the present invention is excellent in both smokability and preservability. In particular, the oxygen gas-transmission is low enough to enable the prolonged storage periods of foodstuffs which are susceptible to oxygen.

COMPARATIVE EXAMPLES 2 TO 5

For Comparative Example 2, a piece of stretched polyethylene terephthalate film (thickness: 12 μm) on the market was formed into a tubular film of 50 mm in folded width, using an adhesive. For comparative Examples 3, 4 and 5, low-density polyethylene (0.92), nylon 6, and a copolymer of monomer of nylon 6 and monomer of nylon 6,6 in a weight ratio of 85 to 15, respectively, were used and tubular unstretched films of 40 μm in thickness and 10 mm in folded width were obtained by the same method as that of Example 1. The results of measurements of the methanol-transmission and oxygen gas-transmission of these films, conducted in the same way as that of Example 1, are shown in Table 3.

TABLE 3

|  | Comparative Examle 2 | Comparative Example 3 | Comparative Example 4 | Comparative Example 5 |
|---|---|---|---|---|
| Sensory Test for Smokability |  |  |  |  |
| Taste | 0 | 1.7 | 2.3 | 2.7 |
| Fragrance | 0.3 | 1.8 | 2.4 | 2.4 |
| Methanol-Transmission ($g/m^2 \cdot day \cdot atm$) | 13 | 910 | 4,500 | 5,900 |
| Oxygen-Transmission ($cc/m^2 \cdot day \cdot atm$) | 120 | 1,000< | 80 | 100 |
| Evaluation |  |  |  |  |
| Smokability | E | B | A | A |
| Preservability | C | D | C | C |

Critieria for Evaluation and Sensory Test for Smokability: Same as in Table 2

EXAMPLE 4

A mixture (weight ratio of 65:35) of the same polyamide as that of Example 3 and a copolymer of ethylene and vinyl alcohol (molar ratio of 31 to 69 and melting point of 181° C.) was prepared as an outer layer of a laminate. A copolymer of ethylene and vinyl acetate in a weight ratio of 67 to 33 was prepared as an inner layer. The outer and inner layers were extruded simultaneously at 230° C. The extended tubular film is immediately cooled by cold water (10° C.) and then stretched at 70° C. by an ordinary inflation method (MD/TD stretching ratio=2.5/4.0, so that a tubular stretched film of 40 μm in thickness (thickness of the outer layer: 25 μm and that of the inner layer: 15 μm) and 70 mm in folded width.

The methanol-transmission, the oxygen gas-transmission, and the smoking effect of the thus-obtained film were measured in the same way as that of Example 1. The results are shown in Table 4.

TABLE 4

|  | Example 4 |
|---|---|
| Initial stress at 25% elongation ($Kg/mm^2$) | 0.15 |
| Sensory Test for Smokability |  |
| Taste | 2.0 |
| Fragrance | 2.1 |
| Methanol-Transmission ($g/m^2 \cdot day \cdot atm$) | 1,200 |
| Oxygen-Transmission ($cc/m^2 \cdot day \cdot atm$) | 46 |
| Evaluation |  |
| Smokability | A |
| Preservability | A |

Criteria for Evaluation and Sensory Test for Smokability: Same as in Table 2

As is obvious from Table 4, smoked food packages according to the present invention have both good smokability and high preservability, and it is not necessary to package the thus smoked food packages again with an ordinary film having oxygen gas-barrier property even with respect to foodstuffs which are susceptible to oxygen.

EXAMPLE 5

The same mixture as that of Example 2 was extruded by means of an extruder provided with a circular die at its tip to produce unstretched tubular films of 50 μm in thickness.

The methanol-transmission, the oxygen gas-transmission, and the smokability of the thus-obtained film were measured in the same way as that of Example 1. The results are shown in table 5.

TABLE 5

|  | Example 5 |
|---|---|
| Initial stress at 25% elongation ($Kg/mm^2$) | 0.25 |
| Sensory Test for Smokability |  |
| Taste | 2.0 |
| Fragrance | 2.3 |
| Methanol-Transmission ($g/m^2 \cdot day \cdot atm$) | 3,700 |
| Oxygen-Transmission ($cc/m^2 \cdot day \cdot atm$) | 29 |
| Measurement of Utility |  |
| Smokability | A |
| Preservability | A |

Criteria for Utility and Sensory Test for Smokability: Same as in Table 2

As is seen from Table 5, smoked food packages according to the present invention have both good smokability and high preservabiity, and it is not necessary to package the thus smoked food packages again with an ordinary film having oxygen gas-barrier property even with respect to foodstuffs which are susceptible to oxygen.

While there has been described what are at present considered to be preferred embodiments of the invention, it will be understood that various modifications may be made thereto, and it is intended that the appended claims cover all such modifications as fall within the true spirit and scope of the invention.

EXAMPLE 6

A resin composition prepared by mixing a nylon 6–12 copolymer (nylon 6 content: 50% by weight; melting point: 130° C. and recrystallization temperature: 92.7° C.) and a copolymer of ethylene and vinyl alcohol (ethylene content: 44 mol%; and melting point: 164° C.) in a ratio of 70 to 30 was melt-extruded at a resin temperature of 230° C. by a mixing extruder provided with a circular die, and rapidly cooling the thus extruded material by water at 8° C.

After heating the thus obtained tubular film by contacting with a heating roll at 50° C., the thus heated tubular film was immediately subjected to inflation-stretching at a stretching ratio of 3.2/4.2 [machine direction (MD)/transverse direction (TD)].

The folded width of the thus obtained shrinkable film was 64 mm and the thickness thereof was 30 μm.

The methanol-transmission, the oxygen gas-transmission, and the smoking effect of the thus-obtained film were measured in the same way as that of Example 1. The results are shown in Table 6.

TABLE 6

|  | Example 6 |
| --- | --- |
| Initial stress at 25% elongation (Kg/mm$^2$) | 0.32 |
| Sensory Test for Smokability |  |
| Taste | 2.3 |
| Fragrance | 2.8 |
| Methanol-Transmission (g/m$^2$ · day · atm) | 2,400 |
| Oxygen-Transmission (cc/m$^2$ · day · atm) | 48 |
| Evaluation |  |
| Smokability | A |
| Preservability | A |

Criteria for Utility Evaluation and Sensory Test for Smokability: Same as in Table 2.

As is obvious from Table 6, smoked food packages according to the present invention have both good smokability and high preservability, and it is not necessary to package the thus smoked food packages again with an ordinary film having oxygen gas-barrier property even with respect to foodstuffs which are susceptible to oxygen.

What is claimed is:

1. A smoked food package produced by packaging a foodstuff with a smokable film and smoking the packaged foodstuff wherein the smokable food-packaging film comprises at least one layer of a mixture of 50 to 80 wt.% polyamide having a melting point of 120° to 210° C. and a recrystallization temperature of not lower than 50° C. and 20 to 50 wt.% α-olefin-vinyl alcohol copolymer, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of said film being 20 to 60 μm.

2. The smoked food package according to claim 1, wherein said polyamide is nylon 6–66, nylon 6–12 or a mixture thereof.

3. The smoked food package according to claim 1, wherein said α-olefin is ethylene, propylene, or butene-1.

4. The smoked food package according to claim 1, wherein the vinyl units in said α-olefin-vinyl alcohol copolymer range from 40 to 80 mol%.

5. A smoked food package produced by packaging a foodstuff with a smokable film and smoking the packaged foodstuff wherein the smokable film comprises:

a layer of a mixture of 50 to 80 wt.% polyamide having a melting point of 120° to 210° C. and a recrystallization temperature of not lower than 50° C. and 20 to 50 wt.% of an α-olefin-vinyl alcohol copolymer;

at least one layer of a thermoplastic material selected from the group consisting of (a) an α-olefin copolymer of polyethylene, polypropylene or polybutene-1, (b) a copolymer of ethylene, propylene or butene-1 and vinyl acetate or methacrylic ester, (c) a copolymer of ethylene, propylene or butene-1 and methacrylic acid, or a metal salt thereof, (d) an elastomer of a plasticized polyvinyl chloride, polyester or a styrene rubber, (e) a cellulose and (f) polyamide, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of the layer of said mixture being 20 to 60 μm and the thickness of the layer of said thermoplastic material being 10 to 50 μm.

6. A smoking process comprising packaging a foodstuff with a smokable film and smoking the packaged foodstuff wherein the smokable film comprises at least one layer of a mixture of 50 to 80 wt.% polyamide having a melting point of 120° to 210° C. and a recrystallization temperature of not lower than 50° C. and 20 to 50 wt.% α-olefin-vinyl alcohol copolymer, said film having properties of an initial stress of not higher than 0.6 Kg/mm$^2$ at a 25% elongation, a transmission to 50% concentration of methanol of not less than 200 g/m$^2$.day.atm at a temperature of 60° C. and a relative humidity of 0%, and an oxygen gas-transmission of not more than 50 cc/m$^2$.day.atm at a temperature of 30° C. and a relative humidity of 60%, and the thickness of said film being 20 to 60 μm.

7. The smoking process according to claim 6, wherein said polyamide is nylon 6–66, nylon 6–12 or a mixture thereof.

8. The smoking process according to claim 6, wherein said α-olefin is ethylene, propylene, or butene-1.

9. The smking process according to claim 6, wherein the vinyl units in said α-olefin-vinyl alcohol copolymer range from 40 to 80 mol%.

10. A smoking process comprising packaging foodstuff with a smokable film and smoking the packaged foodstuff wherein a smokable film comprises a smokable food-packaging film comprising:

a layer of a mixture of 50 to 80 wt.% polyamide having a melting point of 120° to 210° C. and a recrystallization temperature of not lower than 50° C. and 20 to 50 wt.% of an α-olefin-vinyl alcohol copolymer;

at least one layer of a thermoplastic material selected from the group consisting of (a) an α-olefin copolymer of polyethylene, polypropylene or polybutene-1, (b) a copolymer of ethylene, propylene or butene-1 and vinyl acetate or methacrylic ester, (c) a copolymer of ethylene, propylene or butene-1 and methacrylic acid, or a metal salt thereof, (d) an elastomer of a plasticized polyvinyl chloride, polyester or a styrene rubber, (e) a cellulose and (f) a polyamide, said film having properties of an initial stress of not higher than 0.6 Kg/mm$^2$ at a 25% elongation, a transmission to 50% concentration of methanol of not less than 200 g/m².day.atm at a temperature of 60° C. and a relative humidity of 0%, and an oxygen gas-transmission of not more than 50 cc/m².day.atm at a temperature of 30° C. and a relative humidity of 60%, and the thickness of the layer of said mixture being 20 to 60 μm and the thickness of the layer of said thermoplastic material being 10 to 50 μm.

* * * * *